United States Patent
Coan et al.

(10) Patent No.: US 6,584,321 B1
(45) Date of Patent: Jun. 24, 2003

(54) METHOD AND APPARATUS FOR WIRELESS DATA SERVICES OVER A SELECTED BEARER SERVICE

(75) Inventors: William Patrick Coan, Monroe, WA (US); Michael Luna, Brentwood, CA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/427,417

(22) Filed: Oct. 27, 1999

Related U.S. Application Data

(60) Provisional application No. 60/133,074, filed on May 7, 1999.

(51) Int. Cl.[7] ............................................. H04Q 7/20
(52) U.S. Cl. ......................... 455/466; 455/412; 455/552
(58) Field of Search ............................... 455/466, 552, 455/553, 422, 517, 412, 413, 414, 450; 379/221.07, 221.12, 229, 243–246, 311, 355.02, 355.04; 370/329, 352–359, 395.2, 395.3, 395.5, 469, 480, 428

(56) References Cited

U.S. PATENT DOCUMENTS

| | | | |
|---|---|---|---|
| 5,446,736 A | | 8/1995 | Gleeson et al. |
| 5,473,679 A | * | 12/1995 | La Porta et al. ............. 379/201 |
| 5,581,704 A | | 12/1996 | Barbara et al. |
| H1641 H | * | 4/1997 | Sharman ...................... 455/422 |
| 5,644,576 A | | 7/1997 | Bauchot et al. |
| 5,673,322 A | | 9/1997 | Pepe et al. |
| 5,719,918 A | * | 2/1998 | Serbetciouglu et al. ...... 455/466 |
| 5,726,984 A | | 3/1998 | Kubler et al. |
| 5,790,793 A | | 8/1998 | Higley |
| 5,796,727 A | | 8/1998 | Harrison et al. |
| 5,805,804 A | | 9/1998 | Laursen et al. |
| 5,809,415 A | | 9/1998 | Rossmann |
| 5,887,256 A | * | 3/1999 | Lu et al. ....................... 455/426 |
| 5,894,595 A | * | 4/1999 | Foladare et al. ............. 455/414 |
| 5,943,138 A | * | 8/1999 | Fujiki ........................... 358/407 |
| 6,087,956 A | * | 7/2000 | Helferich ................. 340/825.44 |
| 6,128,503 A | * | 10/2000 | Granberg et al. ............ 455/461 |
| 6,144,647 A | * | 11/2000 | Lopez-Torres ............... 370/329 |
| 6,157,845 A | * | 12/2000 | Henry et al. .................. 455/553 |
| 6,167,429 A | * | 12/2000 | Mercer et al. ............... 709/203 |
| 6,192,055 B1 | * | 2/2001 | Rasanen ....................... 370/465 |
| 6,212,389 B1 | * | 4/2001 | Fapojuwo .................... 455/453 |
| 6,263,212 B1 | * | 7/2001 | Ross et al. ................... 455/466 |

FOREIGN PATENT DOCUMENTS

| | | | | |
|---|---|---|---|---|
| EP | 0991218 A | * | 4/2000 | ............. H04L/1/00 |

OTHER PUBLICATIONS

Wireless Application Protocol, Architecture Specification, WAP Architecture, Version Apr. 30, 1998, Wireless Application Protocol Forum, Ltd., 1998.

Wireless Application Protocol, Wireless Session Protocol Specification, WAP WS, Version Apr. 30, 1998, Wireless Application Protocol Forum, Ltd., 1998.

* cited by examiner

*Primary Examiner*—Duc Nguyen
(74) *Attorney, Agent, or Firm*—Kenyon & Kenyon

(57) ABSTRACT

A service message, including a device application identifier and a bearer service indicator, is generated and sent to a wireless communications device. As a result, data can be transmitted between a server and a wireless device over a selected bearer service.

22 Claims, 5 Drawing Sheets

METHOD AND APPARATUS FOR WIRELESS DATA SERVICES OVER A SELECTED BEARER SERVICE

CROSS REFERENCE TO RELATED APPLICATION

The present application claims the benefit of U.S. provisional patent application Ser. No. 60/133,074 entitled "Method and Apparatus for Wireless Data Services over a Selected Bearer Service," filed on May 7, 1999.

FIELD OF THE INVENTION

The field of invention is wireless data communications, and in particular transmitting data over a selected bearer service.

BACKGROUND OF THE INVENTION

The demand for data services that can be accessed via wireless communications devices (i.e., wireless devices) has increased dramatically in recent years. These services place additional demands on the already limited amount of bandwidth that is available over a wireless network.

The increased demand for data services has been addressed by transmitting data on bearer services that carry voice and call control communications, and by deploying additional bearer services directed to data communications. For example, a first-generation cellular system, the Advanced Mobile Phone System (AMPS), included control channels (e.g., reverse control channel, forward control channel) that were used to perform call control (e.g., establish calls). Current North American Time Division Multiple Access (NA-TDMA) systems, also referred to as Interim Standard 136 (IS-136) systems, include a digital control channel (DCCH) that is used to perform both call control and data communications. Data communications carried by the DCCH include short message service (SMS) messages transmitted between a wireless device (e.g., a wireless terminal, a cellular telephone, a computing device coupled to a cellular modem, etc.) and base stations. The DCCH is an example of a broadcast-oriented bearer service for data transmission.

Additional bearer services directed to data communications include: the IS-135 Asynchronous Circuit Switched Data bearer service; the Cellular Digital Packet Data (CDPD) bearer service; and the IS-136 High Speed Packet Data (HSPD) bearer service. The IS-135 bearer service is an example of a connection-oriented bearer service for data transmission. CDPD and HSPD are packet data bearer services that are not connection-oriented bearer services, but rather broadcast-oriented bearer services.

The ability of a DCCH bearer service to transmit data communications is restricted. Use of the DCCH is prioritized to handle call control (e.g., voice call paging traffic) and at the same time allow for limited data transmissions. Increasing the amount of data transmitted over the DCCH can disadvantageously affect the call control operations performed over the DCCH. Data transmissions over the DCCH typically have a high latency. The request/response completion time over the DCCH can have an average range of eighteen to twenty seconds, which corresponds to a simulated average bit rate of 144 to 160 bits per second (bps). Accordingly, the DCCH is an appropriate bearer service for lower-bandwidth, higher-latency data transmissions. Other bearer services, such as the IS-135, CDPD, and HSPD bearer services, are more appropriate bearer services for higher-bandwidth, lower-latency data transmissions. For example, an IS-135 bearer service can provide a bit rate of 9600 bps, a CDPD bearer service can support the transmission of packet data at bit rates of up to 19.2 Kbps, and proposed HSPD bearer services can provide bit rates of up to 300 Kbps. For purposes of this invention, a high bandwidth bearer service can deliver approximately ten or more times the bandwidth of a low bandwidth bearer service.

Known methods of transmitting data over wireless communications networks do not direct certain data services to selected bearer services. FIG. 1 shows a known system for providing data services over a wireless network, which system is taught by U.S. Pat. No. 5,673,322 to Pepe et al., issued Sep. 30, 1997. Wireless device 10 can be coupled to base station 20 via wireless connection 21, and base station 20 is coupled to server 30 by a wired connection. The term "coupled" means connected directly or indirectly. Thus, A is "coupled" to C if A is directly connected to C, and A is "coupled" to C if A is connected directly to B, and B is directly connected to C. Wireless communications device 10 includes a local data compression/decompression proxy 15 to compress data transmissions to server 30 and decompress data transmissions from server 30. Likewise, server 30 includes a remote data compression/decompression proxy 25 to decompress data transmissions from wireless device 10 and compress data transmissions to wireless device 10. Data transmissions between wireless device 10 and server 30 utilize less bandwidth of wireless connection 21 when they are compressed and decompressed by local data compression/decompression proxy 15 and remote data compression/decompression proxy 25.

Data compression/decompression techniques can enable greater amounts of data to be transmitted over the DCCH and other bearer services, but the transmission of too much compressed data over the DCCH can disadvantageously affect the ability of carriers to provide call control for voice services.

In view of the foregoing, a substantial need exists for directing certain data transmissions to selected bearer services.

SUMMARY OF THE INVENTION

The present invention provides a method and apparatus for transmitting data to a wireless communications device over a selected bearer service. In one embodiment of the present invention, a service message, including a device application identifier and a bearer service indicator, is generated and sent to a wireless communications device.

DETAILED DESCRIPTION

A method and apparatus for transmitting data to a wireless device over a selected bearer service is described. In the following description, for purposes of explanation, numerous specific details are set forth to provide a thorough understanding of the present invention. It will be obvious, however, to one skilled in the art that the present invention may be practiced without these specific details. In other instances, well known structures and devices are shown in block diagram form and process steps are shown in flowcharts to describe the present invention. Furthermore, it is readily apparent to one skilled in the art that the specific sequences in which steps are presented and performed are illustrative and it is contemplated that the sequences can be varied and still remain within the spirit and scope of the present invention.

Figure 1:
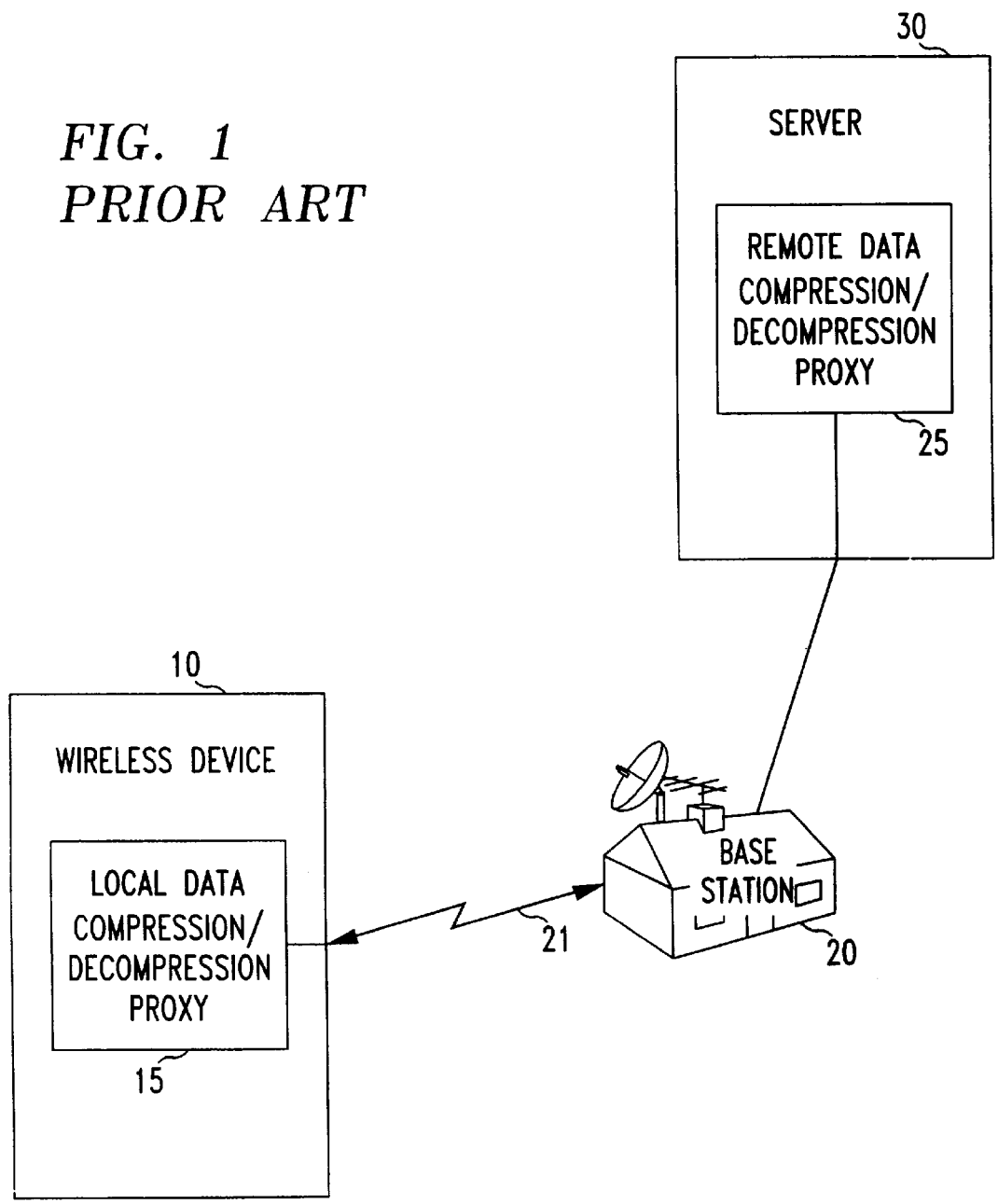
FIG. 1 is a block diagram showing a known system of transmitting data over a wireless communication service.
Figure 2:
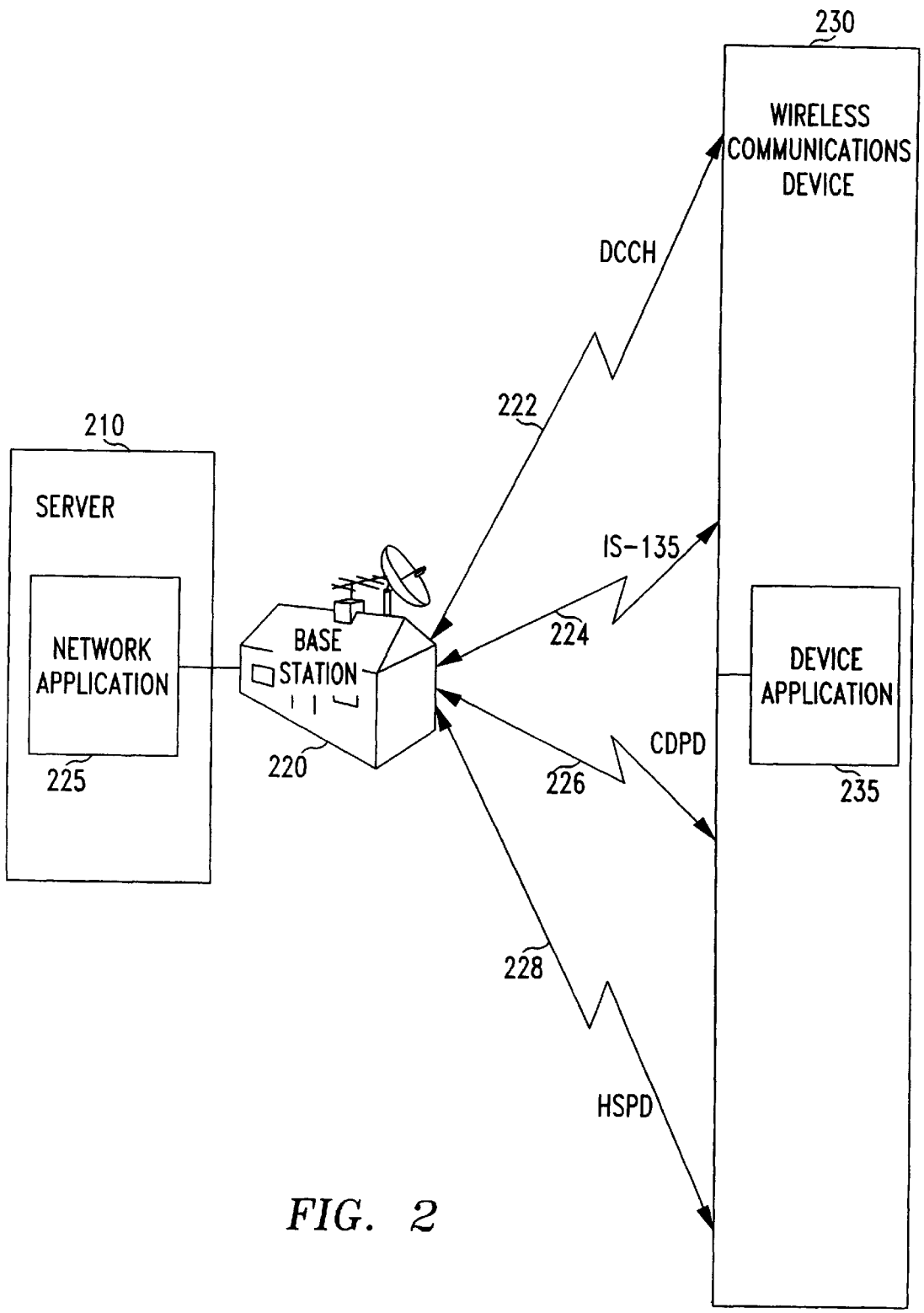
FIG. 2 is a block diagram of a system in accordance with an embodiment of the present invention.

FIG. 2 is a block diagram showing a system in accordance with an embodiment of the present invention. Server 210 is coupled to base station 220, which can be coupled to wireless device 230 via a plurality of bearer services. Examples of the bearer services that can comprise the plurality of bearer services include a DCCH bearer service 222, an IS-135 bearer service 224, a CDPD bearer service 226, and an HSPD bearer service 228.

Server 210 includes a processor (not shown) and a memory (not shown). The processor in one embodiment is a general purpose microprocessor, such as the Pentium II® processor manufactured by the Intel Corporation of Santa Clara, Calif. In another embodiment, the processor is an Application Specific Integrated Circuit (ASIC), which has been designed to perform in hardware and firmware at least part of the method in accordance with an embodiment of the present invention. The memory is any device adapted to store digital information, such as Random Access Memory (RAM), flash memory, a hard disk, an optical digital storage device, or a combination thereof, etc. The memory is coupled to the processor and a port adapted to be coupled to a communication link coupled to base station 220. Stored in the memory of the server 210 is a network application 225.

Network application 225 can send and receive information via base station 220 to the wireless device 230, and has an address, i.e., a network application address. In one embodiment of the present invention, the network application address is a Universal Resource Locator (URL). Network application 225 can be an e-mail application, a Personal Information Manager (PIM) application, a news application, a financial information application, etc. In another embodiment of the present invention, a network application address identifies content (e.g., data, e-mail messages, vCard objects, vCalendar objects, facsimiles, memoranda, files, etc.).

Wireless device 230 includes a processor (not shown) and a memory (not shown), which memory stores device application 235. Device application 235 can be a browser, such as a Phone.com micro browser (i.e., a wireless device web browser), an SMS application, an e-mail application, a vCalendar application, a vCard application, a combination thereof, etc. A device application identifier uniquely identifies the application to the device.

Figure 3:
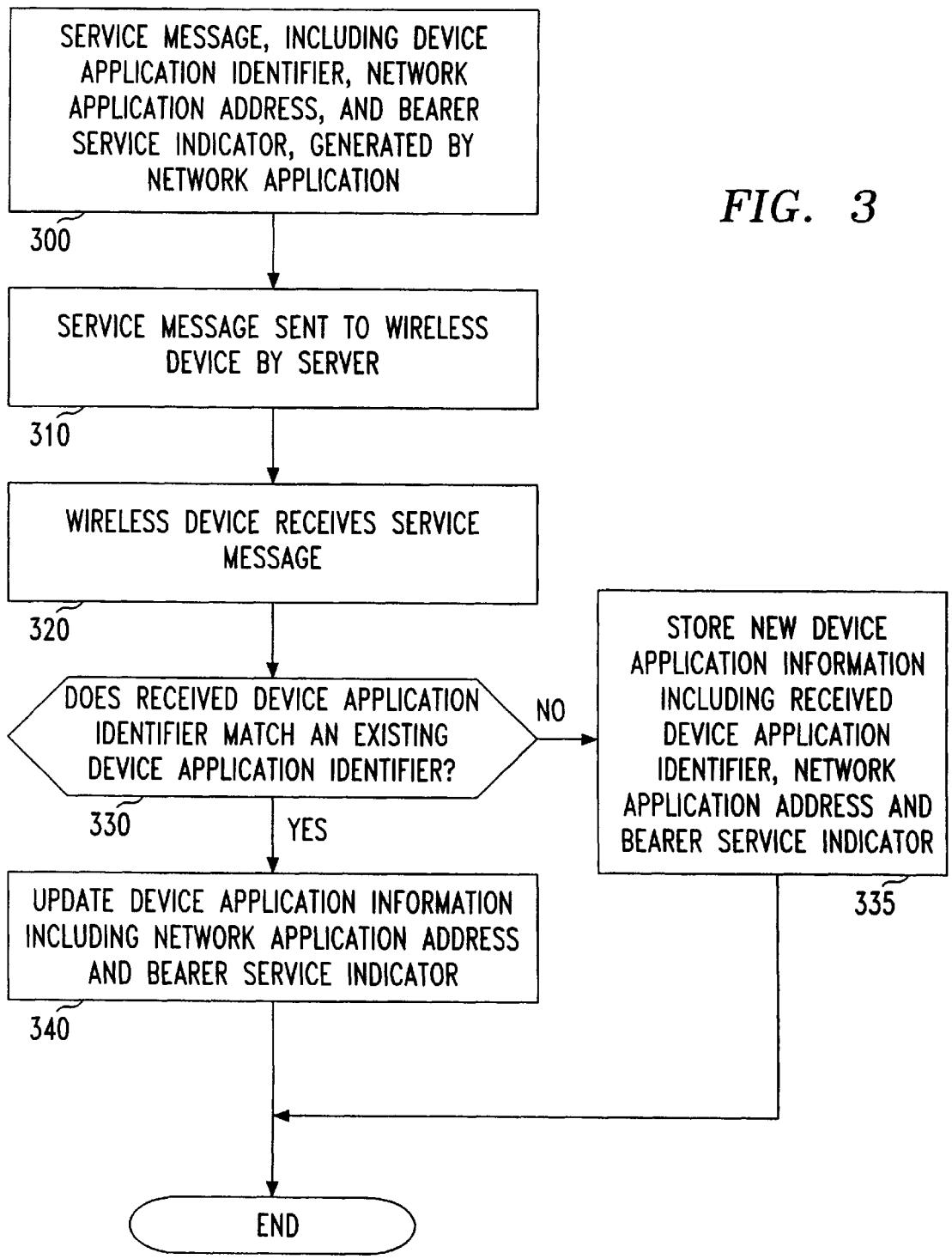
FIG. 3 is a flowchart illustrating exemplary steps in accordance with an embodiment of the present invention whereby device application information is sent to a wireless device.

FIG. 3 is a flowchart showing exemplary steps executed in accordance with an embodiment of the present invention whereby device application information is sent from the network application 225 to the wireless device. Network application 225 can be a Wireless Application Protocol (WAP) or Handheld Device Markup Language (HDML) application that exists on a server 210 of a carrier's intranet.

In another embodiment, the network application 225 resides on a server 210 that is coupled to a carrier's intranet or otherwise coupled to base station 220.

Network application 225 generates a service message, which includes a device application identifier, a network application address, and a bearer service indicator (step 300). In one embodiment of the present invention, the service message includes a displayable name of the service associated with the device application. This name can be presented to the user of the wireless device through a menu displayed on the wireless device 230.

The server 210 then sends the service message to the wireless device 230 via base station 220 (step 310). In one embodiment of the present invention, the service message is pushed to the wireless device 230. Push mechanisms are known in the art. WAP Wireless Session Protocol Specification (WSPS), version Apr. 30, 1998, available online at http://www.wapforum.org/, describes three push mechanisms for data transfer between a server and client (e.g., a device, an application). For example, the WAP WSPS describes a confirmed push mechanism that can be used to send unsolicited information from a server to a wireless device within an active session in a confirmed manner. The WAP WSPS also describes a non-confirmed push mechanism for a connectionless oriented service, wherein the push includes a server address, a client address, and a push identification. In another embodiment of the present invention, the service message is pulled from the server by the wireless device.

Wireless device 230 receives the service message (step 320) and compares the received device application identifier to the device application identifiers of device applications already resident on the wireless device 230 (step 330).

If the received device application identifier matches an existing device application identifier, the wireless device updates the application information of the identified device application with information received in the service message such as the network application address and the bearer service indicator (step 340). The service message can update the network application address and/or the bearer service indicator. For example, a carrier can deploy a new bearer service and move the data transmissions of an existing device application from a different bearer service to the new bearer service by including a new bearer service indicator in the service message. In another embodiment of the present invention, the service message can include a new displayable name of the service provided by a device application. For example, a service name may change due to a new marketing plan, a corporate merger, a change in corporate name, etc.

If the received device application identifier does not match an existing device application identifier, the wireless device is receiving new device application information. Over-the-air programming of applications and services, including setup and deletion of an application or service, in a wireless device is known in the art. An example of such over-the-air programming is the Over-the-air Activation Teleservice (OATS). The new device application information received in the service message can be stored, including the device application identifier, the network application address, and the bearer service indicator (step 335).

In one embodiment of the present invention, the service message is generated by a carrier's gateway and includes 53 octets of data: a two-octet device application identifier, a fifty-octet network application address, and a one-octet bearer service indicator. The wireless device stores the data in non-volatile memory (e:g., flash memory, other persistent memory, etc.). As already described, the two-octet device application identifier can identify the application to the device, which can store ten or more device applications in at least 930 octets of non-volatile memory. The device application identifier can also be used to indicate application types, which allows device vendors to implement local applications, such as SMS messaging, that can be replaced by network applications at a later time. A device application identifier that also indicates specific application types can allow the wireless device to adjust the placement of the application menu option in different, but specific, sub-menus, e.g., such as placing a messaging application in an already present messaging menu. Table 1 below shows how a device application identifier can uniquely identify an application to the wireless device.

TABLE 1

| Device Application Identifier | Device Application |
| --- | --- |
| 0000 | an SMS application |
| 0001 | an EMAIL application |
| 0002 | a Calendar application |
| 0003 | an Address book |

The fifty-octet network application address is an Internet-standard URL that contains the location of an application to be executed when the service is invoked by a service request. In one embodiment, the service message includes a forty-octet application name of Unicode formatted text that specifies the displayable name of the application.

As illustrated in Table 2 below, the one-octet bearer service indicator can specify the bearer service that must be used for the application.

TABLE 2

| Bearer Service Indicator | Usable Bearer Service |
| --- | --- |
| 00 | DCCH |
| 01 | IS-135 |
| 02 | CDPD |
| 03 | HSPD |

In another embodiment of the present invention, as illustrated in Table 3 below, the bearer service indicator can specify the minimum bearer service that can be utilized for the application.

TABLE 3

| Bearer Service Indicator | Minimum Usable Bearer Service |
| --- | --- |
| 00 | DCCH and any other bearer can be used. |
| 01 | IS-135 and any other bearer except DCCH can be used. |
| 02 | CDPD and any other bearer except DCCH and IS-135 can be used. |
| 03 | HSPD and any other bearer except DCCH, IS-135, and CDPD can be used. |

Figure 4:
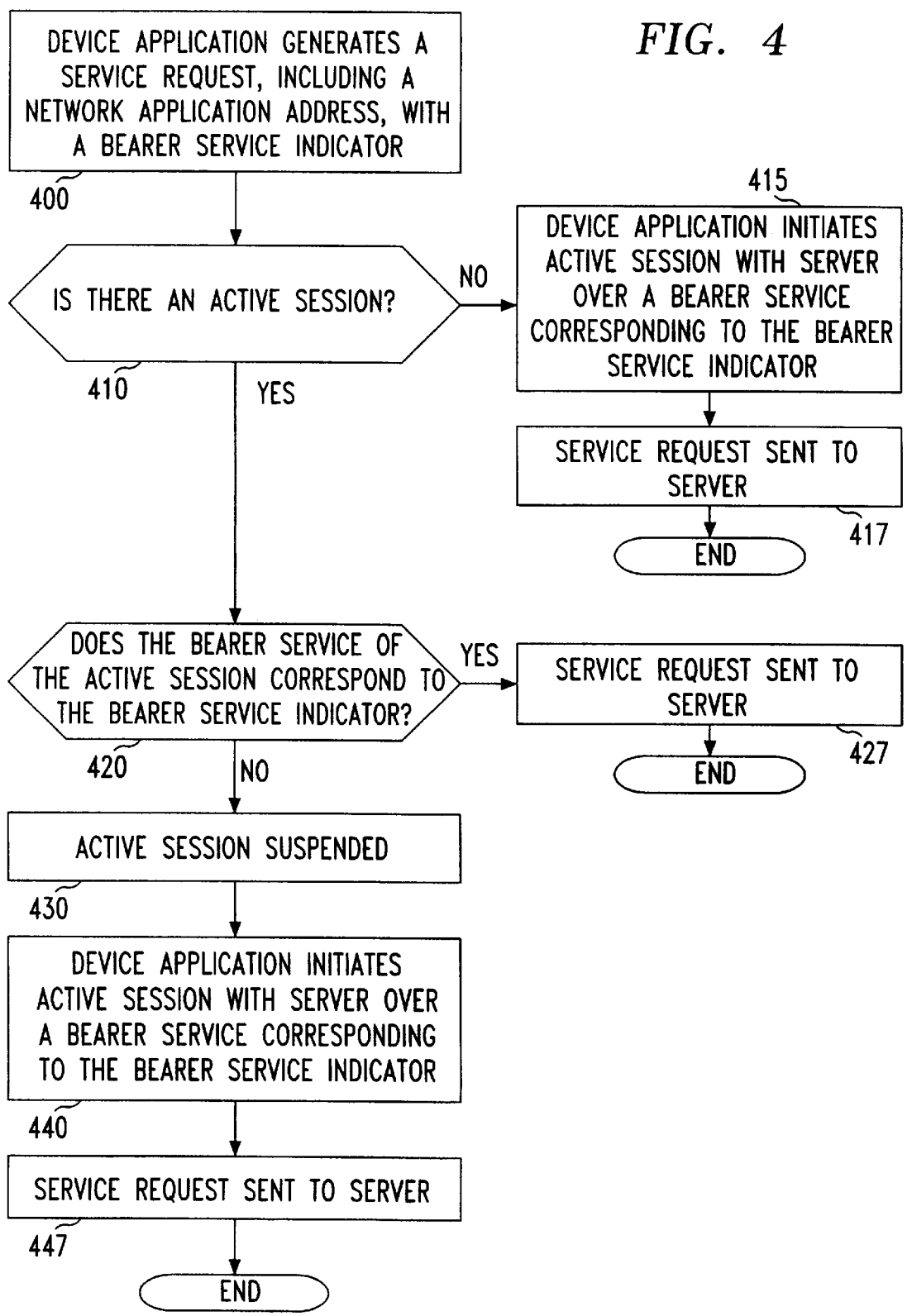
FIG. 4 is a flowchart illustrating exemplary steps in accordance with embodiment of the invention whereby a device application sends a service request over a selected bearer service.

FIG. 4 a flowchart showing exemplary steps executed in accordance with an embodiment of the present invention whereby a device application sends a service request over a selected bearer service to a server. In one embodiment of the invention, the device application 235 generates a service request in response to receiving a service message. In another embodiment of the present invention, the device application 235 generates a service request in response to a user input, e.g., after a user is notified of receipt of the service message. In one embodiment of the present invention, a service message can include service content, e.g., a first portion of an e-mail message, part of daily schedule, the beginning of a memo, etc. After reviewing the service content received in the service message, a user is presented with the option of generating a service request to indicate that additional service content to be delivered. The service request notifies the server that the device application requests delivery of service content.

The device application can generate a service request, including the network application address, with a bearer service indicator (step 400). In one embodiment of the present invention, the bearer service indicator is included in the service request. In another embodiment, the bearer service indicator is not included in the service request. The network application address can identify the location of the network application to be executed in connection with receipt of the service request. In other embodiments, the network application address can specify where the service request is sent, where the service request is pushed, the program with which the device application will establish a session, the location where service content can be pulled, etc. The bearer service indicator designates over which bearer service a session can be established, which bearer service can be used to transmit the service request, which bearer service can be used to send one or more responses to the service request, etc.

The device application determines whether there is an active session (step 410). If there is no active session, the device application can initiate an active session with server 210 via base station 220 over a bearer service corresponding to the bearer service indicator (step 415), and send the service request to the server 210 (step 417). If there is an active session, the device application determines whether the bearer service of the action session corresponds to the bearer service indicator (step 420). If the bearer service of the active session corresponds to the bearer service indicator, the service request can be sent to the server 210 (step 427). If the bearer service of the active session does not correspond to the bearer service indicator, the active session is suspended (step 430), the device application initiates an active session with server 210 over a bearer service corresponding to the bearer service indicator (step 440), and the service request is sent to the server 210 (step 447).

Figure 5:
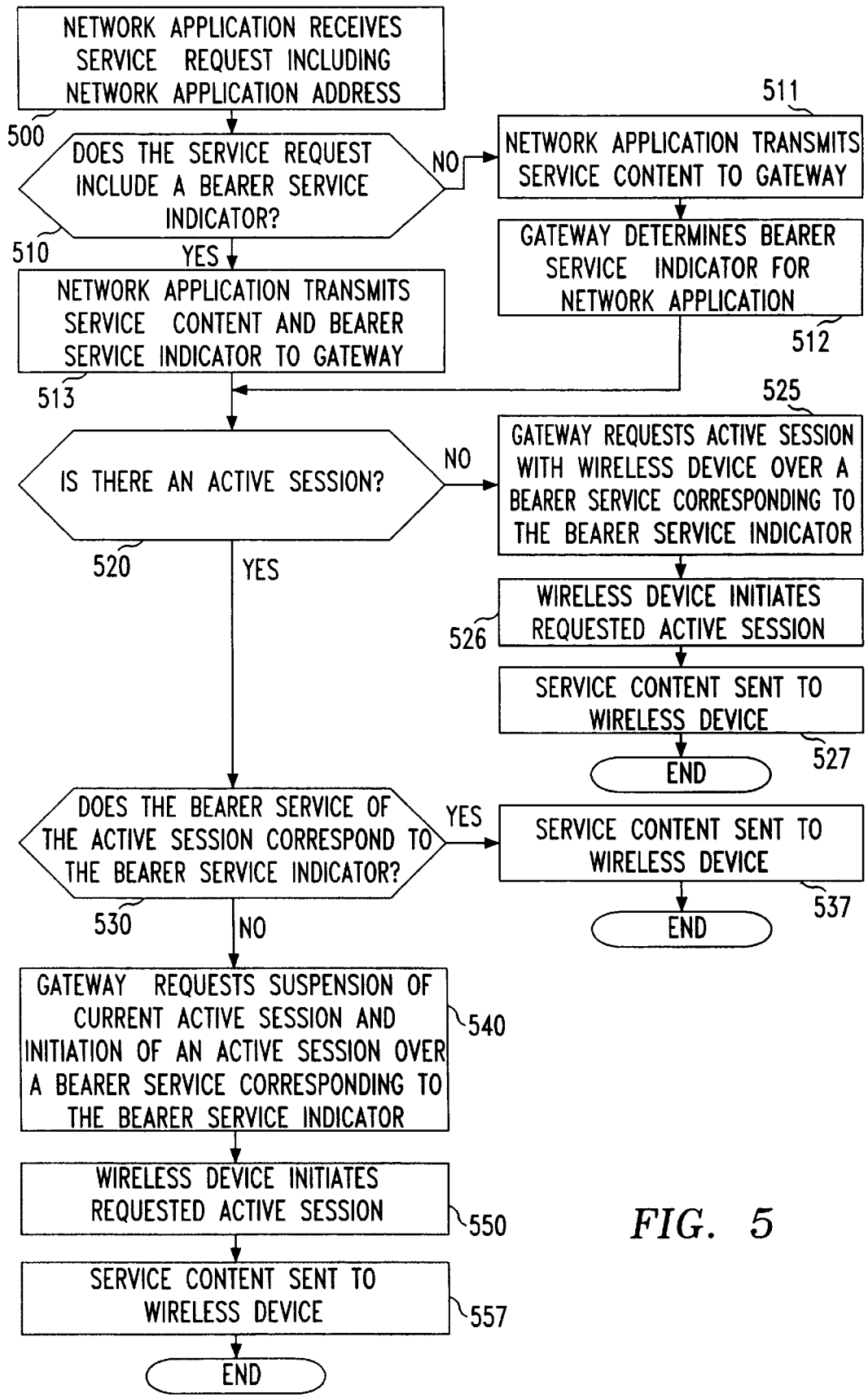
FIG. 5 is a flowchart illustrating exemplary steps in an embodiment of the invention whereby a network application sends service content to a device application over a selected bearer service.

FIG. 5 is a flowchart showing exemplary steps executed in accordance with an embodiment of the present invention whereby the network application sends service content to the device application over a selected bearer service. Examples of service content include e-mail messages, e-mail attachments, text, facsimiles, audio data, video data, financial data, news, a combination thereof, etc. The network application receives the service request including the network application address (step 500). In one embodiment of the present invention, the network application address is included in the header of packet data. In another embodiment, the network application address is translated by a Domain Name Server into an Internet Protocol address prior to receipt by the server 210.

The network application can determine whether the service request includes a bearer service indicator (step 510). If the service request does not include a bearer service indicator, the network application transmits the service content to a gateway coupled to server 210 and base station 220 (step 511), which gateway can determine the bearer service indicator for the network application (step 512), e.g., from a table specifying the bearer service indicator for the network application, etc. Thus, in one embodiment of the present invention, a network application need not transmit a bearer service indicator because there is a default bearer service indicator for the network application. If the service request includes a bearer service indicator, the network application transmits the service content and the bearer service indicator to the gateway (step 513).

In one embodiment of the present invention, a service request includes a bearer service indicator to specify which bearer service can be used for data transmission. For example, a carrier can restrict a network application to certain bearer services for data transmission to device applications, e.g., to the IS-135 or CDPD bearer services. A user can further restrict which bearer service will be used, e.g., specify that only the CDPD bearer service be used. Thus, a service request from that user can include a bearer service indicator specifying the CDPD bearer service. In another embodiment, the service request does not include a bearer service indicator, but the network application can further restrict which of the carrier-restricted bearer services will be used by determining a bearer service indicator from data stored on the server 210, e.g., from a table specifying the bearer service indicator for the network application, from data specifying the bearer service indicator for the device application that sent the service request, from a table specifying the bearer service indicator for the wireless device that sent the service request, etc.

In another embodiment, a network application transmits data to wireless devices of a plurality of carriers. Each carrier can restrict the network application to data transmission over different bearer services, e.g., by storing the bearer service indicator on a gateway that receives data from the network application. For example, carrier A can specify that the network application service content be transmitted over a CDPD bearer service, and carrier B can specify that the network application service content be transmitted data over either the CDPD or HSPD bearer services.

In the embodiment illustrated in FIG. 5, after the gateway receives the service content, it determines if there is an active session (step 520). If there is no active session, the gateway requests initiation of an active session with the wireless device over a bearer service corresponding to the bearer service indicator (step 525), the wireless device 230 initiates the requested active session (step 526), and the service content is sent to the wireless device (step 527). If there is an active session, the gateway determines whether the bearer service of the active session corresponds to the bearer service indicator (step 530). If the bearer service of the active session corresponds to the bearer service indicator, the service content is sent to the wireless device 230 (step 537). If the bearer service of the active session does not correspond to the bearer service indicator, the gateway requests suspension of the current active session and initiation of an active session over a bearer service corresponding to the bearer service indicator (step 540), the wireless device 230 initiates the requested active session over a bearer service corresponding to the bearer service indicator (step 550), and the service content is sent to the wireless device 230 (step 557).

In accordance with one embodiment of the present invention, instructions adapted for execution are stored on a medium and distributed as software. The medium is any device adapted to store digital information, and corresponds to the memory of server 210. For example, a medium is a portable magnetic disk, such as a floppy disk; or a Zip® disk, manufactured by the Iomega Corporation of Roy, Utah; or a Compact Disk Read Only Memory (CD-ROM) as is known in the art for distributing software. The medium is distributed to a user that has a processor suitable for executing instructions adapted for execution, e.g. a processor of server 210, a processor of wireless device 230, etc. The term "adapted for execution" is meant to encompass any instructions that are ready for execution in their present form (e.g., machine code) by a processor, or require further manipulation (e.g., compilation, decryption, or provided with an access code, etc.) to be ready for execution by a processor.

Thus, the present invention provides a method and apparatus whereby wireless data services can receive and send data over selected bearer services. Carriers can restrict which bearer services are utilized by an application to transmit service requests and service content. Shared bearer services, such as the DCCH, can be utilized to send service messages to wireless devices to update and/or establish device application information. Higher-bandwidth, lower-latency data services can be moved to appropriate bearer services.

The invention has been described in conjunction with the preferred embodiment. It is evident that numerous alternatives, modifications, and uses will be apparent to those skilled in the art in light of the foregoing description.

What is claimed is:

1. A method for transmitting data to a wireless communications device over a selected bearer service, comprising:
   generating a service message, the service message including
      a device application identifier, and
      a bearer service indicator, wherein the bearer service indicator includes identities of at least two usable bearer services, wherein one of the at least two usable bearer services is a minimum usable bearer service for the identified device application; and
   sending the service message to the wireless communications device.

2. The method of claim 1, further comprising:
   receiving, over a bearer service corresponding to the bearer service indicator, a service request.

3. The method of claim 2, wherein the service request includes a second bearer service indicator.

4. The method of claim 3, further comprising:
   sending to the wireless communications device, over a bearer service corresponding to the second bearer service indicator, service content.

5. The method of claim 2, further comprising:
   sending to the wireless communications device, over a bearer service corresponding to the bearer service indicator, service content.

6. The method of claim 1, wherein sending the service message to the wireless communications device includes sending the service message over a call control channel.

7. The method of claim 1, wherein sending the service message to the wireless communications device includes sending the service message over a broadcast-oriented bearer service.

8. An apparatus for transmitting data to a wireless communications device over a selected bearer service, comprising:
   a processor; and
   a memory, coupled to said processor, for storing a plurality of instructions adapted for execution by said processor to:

generate a service message, the service message including
- a device application identifier, and
- a bearer service indicator, wherein the bearer service indicator includes identities of at least two usable bearer services, wherein one of the at least two usable bearer services is a minimum usable bearer service for the identified device application; and send the service message to the wireless communications device.

9. The apparatus of claim 8, wherein the plurality of instructions adapted for execution by said processor include instructions to:

receive, over a bearer service corresponding to the bearer service indicator, a service request.

10. The apparatus of claim 9, wherein the service request includes a second bearer service indicator.

11. The apparatus of claim 10, wherein the plurality of instructions adapted for execution by said processor include instructions to:

send to the wireless communications device, over a bearer service corresponding to the second bearer service indicator, service content.

12. The apparatus of claim 9, wherein the plurality of instructions adapted for execution by said processor include instructions to:

send to the wireless communications device, over a bearer service corresponding to the bearer service indicator, service content.

13. A medium storing a plurality of instructions adapted for execution by a processor for transmitting data to a wireless communications device over a selected bearer service, said plurality of instructions comprising instructions to:

generate a service message, the service message including
- a device application identifier, and
- a bearer service indicator, wherein the bearer service indicator includes identities of at least two usable bearer services, wherein one of the at least two usable bearer services is a minimum usable bearer service for the identified device application; and send the service message to the wireless communications device.

14. The medium of claim 13, wherein said plurality of instructions further comprise instructions to:

receive, over a bearer service corresponding to the bearer service indicator, a service request.

15. The medium of claim 14, wherein the service request includes a second bearer service indicator.

16. The medium of claim 15, wherein said plurality of instructions further comprise instructions to:

send to the wireless communications device, over a bearer service corresponding to the second bearer service indicator, service content.

17. The medium of claim 14, wherein said plurality of instructions further comprise instructions to:

send to the wireless communications device, over a bearer service corresponding to the bearer service indicator, service content.

18. A medium storing a plurality of instructions adapted for execution by a processor for receiving data on a wireless communications device over a selected bearer service, said plurality of instructions comprising instructions to:

receive a service message including
- a device application identifier, and
- a bearer service indicator, wherein the bearer service indicator includes identities of at least two usable bearer services, wherein one of the at least two usable bearer services is a minimum usable bearer service for the identified device application; and store the bearer service indicator in the wireless communications device.

19. The medium of claim 18, wherein said plurality of instructions further comprise instructions to:

send, over a bearer service corresponding to the bearer service indicator, a service request.

20. The medium of claim 19, wherein the service request includes a second bearer service indicator.

21. The medium of claim 20, wherein said plurality of instructions further comprise instructions to:

receive, over a bearer service corresponding to the second bearer service indicator, service content.

22. The medium of claim 19, wherein said plurality of instructions further comprise instructions to:

receive, over a bearer service corresponding to the bearer service indicator, service content.

* * * * *